(12) United States Patent
Mahler et al.

(10) Patent No.: US 8,981,767 B2
(45) Date of Patent: Mar. 17, 2015

(54) INDUCTIVE SENSOR MODULE AND INDUCTIVE PROXIMITY SENSOR

(75) Inventors: Simon Mahler, Bern (CH); Martin Kohler, Biel (CH); Matthias Kohler, Hondrich (CH); Michael Frauchiger, Worben (CH); Christian Gnaegi, Nidau (CH)

(73) Assignee: BALLUFF GmbH, Neuhausen (DE)

( * ) Notice: Subject to any disclaimer, the term of this patent is extended or adjusted under 35 U.S.C. 154(b) by 790 days.

(21) Appl. No.: 12/661,827

(22) Filed: Mar. 23, 2010

(65) Prior Publication Data

US 2010/0264939 A1   Oct. 21, 2010

(30) Foreign Application Priority Data

Apr. 17, 2009 (DE) .......................... 10 2009 018 644

(51) Int. Cl.
*G01B 7/14* (2006.01)
*G01D 5/20* (2006.01)
*G01D 11/24* (2006.01)

(52) U.S. Cl.
CPC .............. *G01D 5/204* (2013.01); *G01D 11/245* (2013.01)
USPC ............ 324/207.15; 324/207.17; 324/207.22; 324/207.26; 324/654

(58) Field of Classification Search
CPC ..... G01R 27/28; G01D 11/245; G01D 11/24; H03K 17/9505; G01B 7/14; G01B 7/30; G01B 7/023; G01V 3/104; H05K 3/366
USPC ..................................................... 324/207.15
See application file for complete search history.

(56) References Cited

U.S. PATENT DOCUMENTS

| | | | |
|---|---|---|---|
| 6,313,624 B1 * | 11/2001 | Alhorn et al. | 324/207.17 |
| 6,332,359 B1 | 12/2001 | Ueyanagi et al. | |
| 6,486,796 B2 | 11/2002 | Miyata | |
| 6,650,111 B2 * | 11/2003 | Christensen | 324/207.26 |
| 6,734,665 B2 | 5/2004 | Jagiella et al. | |
| 7,157,903 B2 | 1/2007 | Rissing | |
| 2002/0039023 A1 * | 4/2002 | Jagiella et al. | 324/207.26 |
| 2004/0164728 A1 | 8/2004 | Rissing | |
| 2005/0124209 A1 * | 6/2005 | Currie et al. | 439/490 |
| 2007/0188163 A1 * | 8/2007 | Jagiella et al. | 324/207.15 |

FOREIGN PATENT DOCUMENTS

| | | |
|---|---|---|
| DE | 43 14 296 | 11/1994 |
| DE | 199 03 585 | 8/1999 |
| DE | 100 48 290 | 5/2002 |
| DE | 103 55 003 | 6/2005 |
| EP | 1 450 135 | 8/2004 |

* cited by examiner

*Primary Examiner* — Tung X Nguyen
*Assistant Examiner* — Son Le
(74) *Attorney, Agent, or Firm* — Lipsitz & McAllister, LLC (57) ABSTRACT

Inductive sensor module comprising a coil arrangement and a carrier, on which electronic components are arranged, wherein the coil arrangement is arranged on a first side of the carrier and the electronic components are arranged on a second side of the carrier directed away from the first side.

23 Claims, 7 Drawing Sheets

INDUCTIVE SENSOR MODULE AND INDUCTIVE PROXIMITY SENSOR

This application claims the benefit of German Patent Application No. 10 2009 018 644.1 filed on Apr. 17, 2009.

The present disclosure relates to the subject matter disclosed in German application number 10 2009 018 644.1 of Apr. 17, 2009, which is incorporated herein by reference in its entirety and for all purposes.

BACKGROUND OF THE INVENTION

The invention relates to an inductive sensor module comprising a coil arrangement and a carrier, on which electronic components are arranged.

SUMMARY OF THE INVENTION

In accordance with an embodiment of the present invention, an inductive sensor module is provided, which can be produced with small dimensions in a simple manner.

In accordance with an embodiment of the invention, the coil arrangement is arranged on a first side of the carrier and the electronic components are arranged on a second side of the carrier directed away from the first side.

In accordance with the invention the coil arrangement is arranged on a front side of the carrier and the electronic components are arranged, and in particular an evaluation device is at least partially arranged, on an opposite rear side of the carrier. This results in an optimised space saving. A sensor module is provided which is independent with respect to the sensor function. It only needs to be supplied with electrical energy and corresponding sensor signals have to be conveyed. However, no further evaluation device located outside the sensor module is necessary.

The inductive sensor module can be produced in few steps. In particular, assembly of the carrier is possible in a simple manner. For example, SMD processes can be used.

In particular, the coil arrangement comprises a pot core and at least one coil. This results in an optimised sensor function.

It is advantageous if the pot core is seated on a board like a printed circuit board, wherein the board is arranged on the first side of the carrier. This allows, for example, bonding of a coil to the board to be achieved in a simple manner during production of the sensor module, and the coil arrangement can in turn be fixed to the carrier including electrical contacting in a simple manner.

In particular, the board has electrical contact areas, which provide electrical contact paths from a side facing the pot core to the carrier. The board is through-plated at the electrical contact areas. As a result, the electrical contact between the coil arrangement and the carrier can be created in a simple manner and in particular the electrical contact is created by the connection and fixture of the board to the carrier. The production steps for the sensor module can thus be minimised.

It is most particularly advantageous if the pot core has at least one recess, which extends through to the board. In this case, the at least one recess is aligned with corresponding electrical contact areas. As a result, an electrical connection of the at least one coil to the contact areas can be made in a simple manner and thus an electrical contacting of the at least one coil with the carrier and the electronic components there can in turn be produced in a simple manner. Access can be made from an upper side through the at least one recess. For example, connection wires of the at least one coil can thus be connected to the electrical contact areas by thermocompression welding.

It is advantageous if connection wires of the at least one coil are arranged in the at least one recess. As a result, the electrical contacting can be produced in a simple manner.

It is most particularly advantageous if electronic components and preferably all electronic components of an evaluation device are arranged on the second side of the carrier. This enables an "independent" inductive sensor module to be provided which is universally usable. For the same reason, it is advantageous if all elements of an internal connection device for external communication by means of an electrical connection device are arranged on the second side of the carrier.

It is favourable if a plurality of pin elements are provided, which project beyond the second side of the carrier. The pin elements can be used to mechanically and/or electrically secure the sensor module in order to provide a complete inductive proximity sensor including the external connection device. For example, the sensor module can be attached to a board like a printed circuit board or the like of an inductive proximity sensor including the electrical connection device by means of the pin elements. It is also possible to connect a cable by means of the pin elements. The pin elements are oriented transversely and in particular perpendicularly to the surface of the second side of the carrier.

It is favourable if the pin elements are secured in recesses of the carrier. For example, these are pressed in and additionally secured by means of cold-welding. This results in a universal applicability with ease of production.

It is favourable if a mechanical fixture of the sensor module is possible by means of the pin elements. This results in extensive application alternatives.

The pin elements provide the electrical contact to the inductive sensor module. Upon appropriate connection an external connection device (such as a cable or plug connection) can provide the energy supply of the inductive sensor module through the pin elements. Moreover, sensor signals can be conveyed.

Three pin elements are provided in one exemplary embodiment. Two pin elements serve for electrical energy supply and one pin element serves to provide a sensor signal.

In one embodiment a cable fixture element is arranged on the carrier on the second side. A cable can be fixed to the sensor module by means of this cable fixture element.

It is most particularly advantageous if the cable fixture element is fixed to pin elements. The pin elements are elements for the electrical contact of the sensor module to the outside world. They can also serve as mechanical fixing means for the cable fixture element.

It is favourable if the cable fixture element has fixture regions for fixture of a respective cable conductor. As a result, an electrical connection between the inductive sensor module and a cable as connection to the outside world can be produced in a simple manner. For example, this connection is produced by clamping, soldering or gluing.

In particular, a cable conductor can be connected to a pin element at a fixture region in order to produce an electrical connection.

In an embodiment the fixture regions are configured as clamping regions for clamping the respective cable conductors.

It is additionally favourable if the cable fixture element has at least one receiving area for a cable. The cable can be guided in a sub-region and possibly also fixed in this receiving area.

It is favourable if the at least one receiving area allows a cable feed in a direction parallel to the direction of spacing between the coil arrangement and the carrier and/or allows a cable feed in transverse direction to this direction of spacing. This direction of spacing is also the direction of spacing between the first side and the second side of the carrier. In the case of a parallel alignment of the cable an axial cable feed to the sensor module is provided. In the case of an alignment transverse and in particular perpendicular thereto, a radial cable feed is provided. In particular, both cable feed possibilities are provided on the same cable fixture element.

It is favourable if the cable fixture element is optically transparent. As a result, optical signals from one or more light-emitting diodes, for example, arranged on the second side of the carrier, can be detected through the cable fixture element.

In one embodiment the sensor module is configured in a button shape with an at least approximately circular outer contour cross-section. This results in an optimised use of space with minimisation of the external dimensions of the sensor module.

The invention additionally relates to an inductive proximity sensor which comprises at least one sensor module in accordance with the invention. The inductive proximity sensor also allows connection to the outside world in a simple manner, for example, by means of a plug connection or cable connection.

In this case, the inductive proximity sensor can be configured as an analog or digital proximity sensor or distance or path sensor.

In particular, an electrical connection device is provided, which is electrically connected to the at least one sensor module. By means of the electrical connection device, which is in particular standardised, the sensor module can then be supplied with electrical energy and sensor signals can be conveyed by means of the electrical connection device.

In one embodiment the at least one sensor module is seated directly on the electrical connection device. This allows an inductive proximity sensor with low height dimensions to be provided.

In a further embodiment the at least one sensor module is seated on a connector, to which the electrical connection device is at least electrically connected. The connector provides a mechanical fixture of the at least one sensor module and assures an electrical connection. The connector then couples the at least one sensor module to the electrical connection device. The electrical connection device can also be seated on the connector in this case.

The following description of preferred embodiments serves for more detailed explanation of the invention in association with the drawings.

BRIEF DESCRIPTION OF THE DRAWINGS

FIGS. 6(*a*) to (*d*) show different structural elements of a coil arrangement of an exemplary embodiment of an inductive sensor module;

FIGS. 6(*e*), (*f*) show a coil arrangement in plan view;

DETAILED DESCRIPTION OF THE INVENTION

An exemplary embodiment of an inductive sensor module, which is shown in FIGS. 1 to 5 and given the reference 10 there, comprises a carrier 12 (mother board 12). The carrier 12 has a first side 14 (front side) and a second side 16 (rear side) directed away from the first side. The carrier 12 extends between the first side 14 and the second side 16. In particular, the carrier 12 is in the form of a plate.

The carrier 12 is configured as a circular disc in an exemplary embodiment.

A coil arrangement 18 is seated on the first side 14 of the carrier 12. The coil arrangement 18 comprises one or more coils as sensitive elements.

In one exemplary embodiment (FIG. 6) the coil arrangement 18 has a board 20. The board 20 is configured in the form of a plate. Contact areas 22*a*, 22*b*, 22*c* are arranged on the board 20. These contact areas 22*a*, 22*b*, 22*c* are arranged on a first side 24. In this case, they are in electrical contact with a respective contact path, which leads from the first side 24 to a second side 26. The second side 26 is directed away from the first side 24. The coil arrangement 18 is fixed to the carrier 12, i.e. to its first side 14, via the second side 26.

Figure 6:
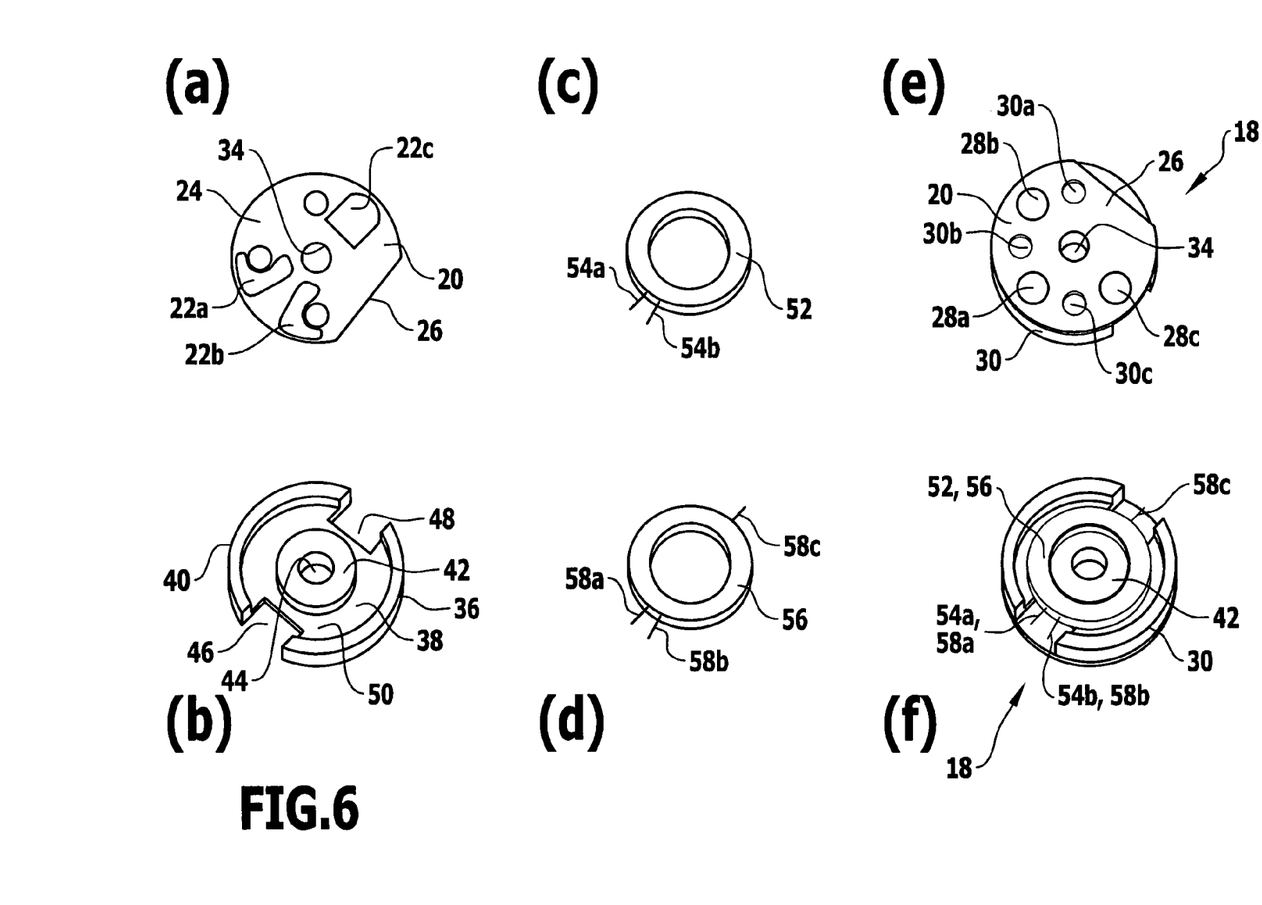

The contact paths with corresponding contact areas on the second side 26 are indicated in FIG. 6(*e*) with the reference numerals 28*a*, 28*b*, 28*c*. For example, in this case the contact path 28*a* is assigned to contact area 22*a* etc.

The electrical contact of the coil arrangement 18 to the carrier 12 is produced via the contact paths 28*a*, 28*b*, 28*c*.

The board 20 additionally has recesses 30*a*, 30*b*, 30*c*, in which pin elements 32*a*, 32*b*, 32*c* are arranged in a part-region, as is explained in more detail below.

The board 20 additionally has a central recess 34, which serves for centering.

The coil arrangement 18 additionally comprises a pot core 36. This has a base 38, beyond which a wall 40 projects. In a central region the pot core 36 additionally comprises a ring-shaped hub 42 projecting from the base 38. The hub 42 surrounds a recess 44, which corresponds to the central recess 34 of the board 20.

In this case, the pot core 36 has an outer contour with a circular cross-section. In this case the wall 40 is interrupted; the pot core 36 has recesses 46, 48, which when the pot core 36 is placed on the board 20 leave the contact areas 22*a*, 22*b*, 22*c* free, so that access can be made to these contact areas 22*a*, 22*b*, 22*c* in the direction of the first side 24 of the board 20 in particular to be able to weld or solder in particular wires of coils of the coil arrangement 18 to the corresponding contact areas 22*a*, 22*b*, 22*c*.

The pot core 36 has a receiving area 50, which lies between the hub 42 and the wall 40. This receiving area 50 is in particular ring-shaped in configuration.

At least one coil is seated in this receiving area 50. In an exemplary embodiment one coil 52 is seated in the receiving area 50. This coil has connection wires 54*a*, 54*b*. These are connected to the contact areas 22*a*, 22*b*, for example, by thermowelding or soldering.

In another exemplary embodiment a coil 56 is provided with connection wires 58*a*, 58*b*, 58*c*, which are accordingly electrically connected to the contact areas 22*a*, 22*b*, 22*c* and in particular are welded or soldered.

The connection wires 54*a*, 54*b* and 58*a*, 58*b*, 58*c* respectively lie in the recesses 46 and 48 to allow access from above for production of the electrical connection.

Other coil arrangements are also possible, e.g. with transmitting coil and receiving coil and/or additional compensation coil etc.

The pot core 36 is made from a suitable material with corresponding magnetic properties.

The pot core 36 with the coil 52 or 56 is arranged on the printed circuit board 20. As mentioned above, the entire coil arrangement 18 is fixed to the carrier 12 on its first side 14.

Figure 4:
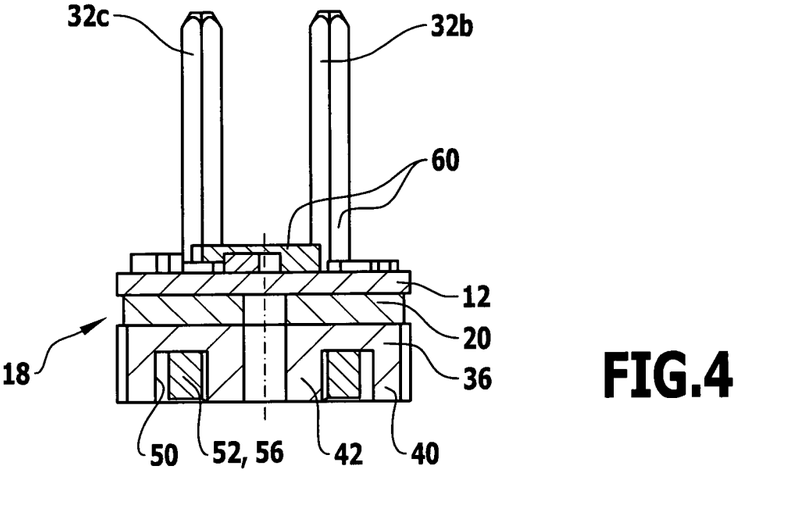
FIG. 4 is a sectional view taken along line 4-4 of the inductive sensor module in accordance with FIG. 3.
Figure 5:
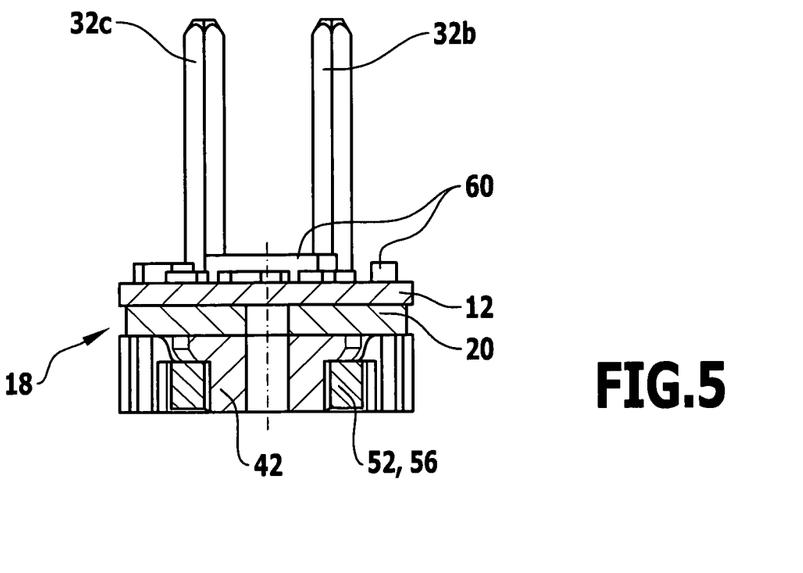
FIG. 5 is a sectional view taken along line 5-5 of the inductive sensor module in accordance with FIG. 3.

Electronic components 60 of the sensor module 10 are arranged directed away from the coil arrangement 18 on the second side 16 of the support 12. In particular, an evaluation device 62 of the sensor module 10 is arranged at least partially on the second side 16 of the carrier 12. In addition, an (internal) connection device is arranged on the second side 16. The evaluation device 62 (and the internal connection device) of the sensor module 10 is preferably arranged completely on the carrier 12.

A complete inductive sensor module 10 is then provided that in particular can form an inductive proximity sensor after connection to an external connection device.

The pin elements 32*a*, 32*b*, 32*c*, which form contact pins, are fixed to corresponding recesses of the carrier 12 and are inserted into the recesses 30*a*, 30*b*, 30*c* of the board 20. The pin elements 32*a*, 32*b*, 32*c* are fixed to the carrier 12 (and the board 20) in particular by pressing.

Figure 1:
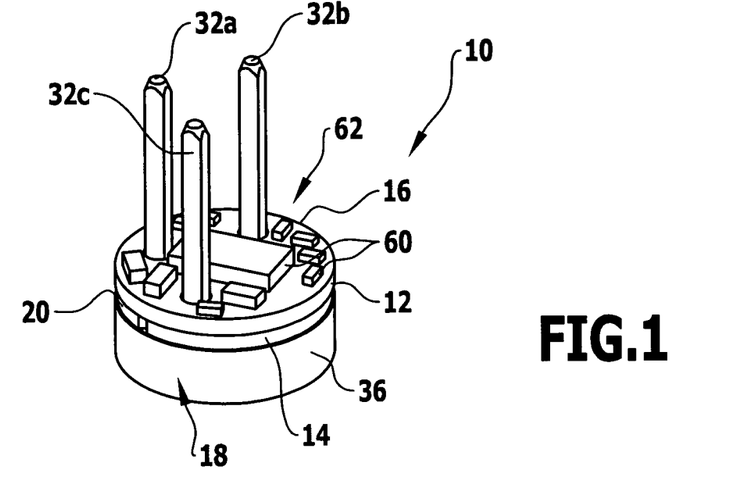
FIG. 1 is a perspective representation of an exemplary embodiment of an inductive sensor module in accordance with the invention.
Figure 2:
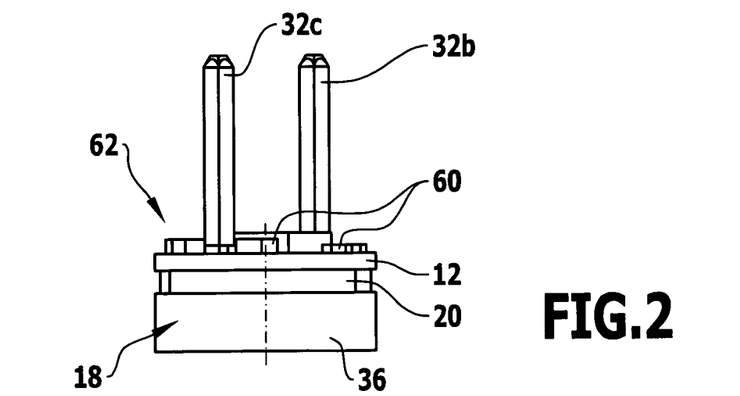
FIG. 2 is a side view of the inductive sensor module in accordance with FIG. 1.

The pin elements 32*a*, 32*b*, 32*c* project transversely and in particular perpendicularly upwards beyond the second side 16 of the carrier 12.

In an exemplary embodiment three pin elements are provided for a power supply and for an output signal.

Figure 3:
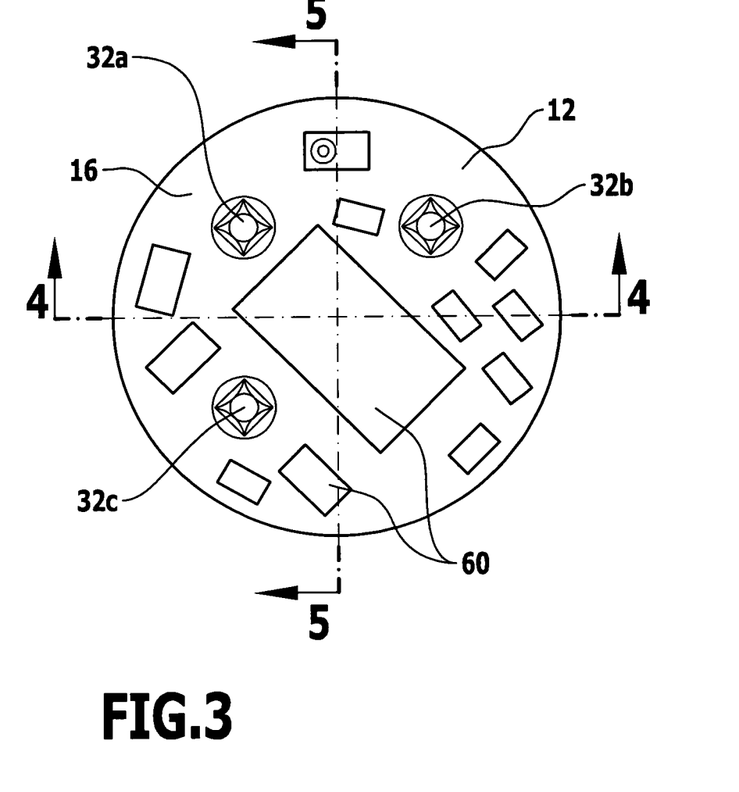
FIG. 3 is a plan view onto the inductive sensor module in accordance with FIG. 1.

The electronic components 60 of the evaluation device 62 are arranged between the regions of the pin elements 32*a*, 32*b*, 32*c*, at which these are fixed to the carrier 12.

Figure 7:
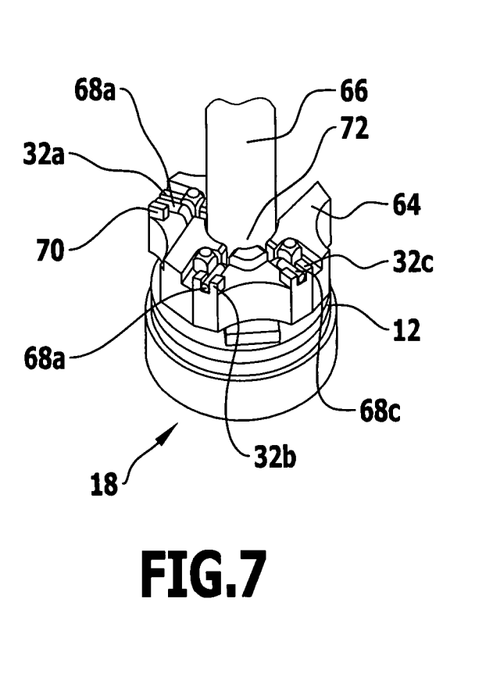
FIG. 7 shows an exemplary embodiment of an inductive sensor module with cable connection.
Figure 8:
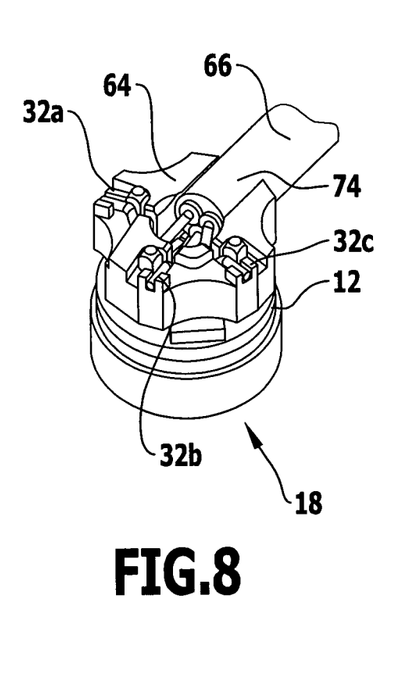
FIG. 8 shows a further exemplary embodiment of an inductive sensor module with cable connection.

In an exemplary embodiment shown in FIGS. 7 and 8, a cable fixture element 64 is arranged on the carrier 12 on the second side 16. The cable fixture element 64 is mechanically fixed to the pin elements 32*a*, 32*b*, 32*c*. The cable fixture element 64 serves to fix the cable 66 to the corresponding sensor module 10. The cable 66 has conductors 68*a*, 68*b*, 68*c*. In the region of the pin elements 32*a*, 32*b*, 32*c* the cable fixture element 64 has respective clamping regions 70 as fixing regions, to which the conductors (e.g. 68*a*) can be clamped to the respective pin element (e.g. 32*a*). This enables an electrical contact to be produced in a simple manner to supply energy to the sensor module 10 and to convey signals.

The cable fixture element 64 has a first receiving area 72 (FIG. 7) for the cable 66. This first receiving area 72 is centrally arranged. The cable 66 can be inserted in a part-region in an (axial) direction parallel to the direction of spacing between the first side 14 and the second side 16 of the carrier 12. The conductors 68*a*, 68*b*, 68*c* are then directed transversely away and clamped at the respective clamping regions 70.

The cable fixture element 64 additionally has a second receiving area 74, which lies between outer clamping regions (FIG. 8). The cable 66 can be inserted laterally, i.e. transversely and in particular perpendicularly (in radial direction) to the direction of spacing between the first side 14 and the second side 16 of the carrier 12, via the second receiving area 74.

In particular, the first receiving area 72 and the second receiving area 74 are provided on the same cable fixture element 64, so that the same cable fixture element 64 can be used for different applications.

In the exemplary embodiment in accordance with FIGS. 7 and 8, the pin elements 32*a*, 32*b*, 32*c* serve to fix the cable fixture element 64 and additionally to produce the electrical contact. The energy supply occurs through the cable 66. Moreover, signals are conveyed through a corresponding conductor of the cable 66.

Figure 9:
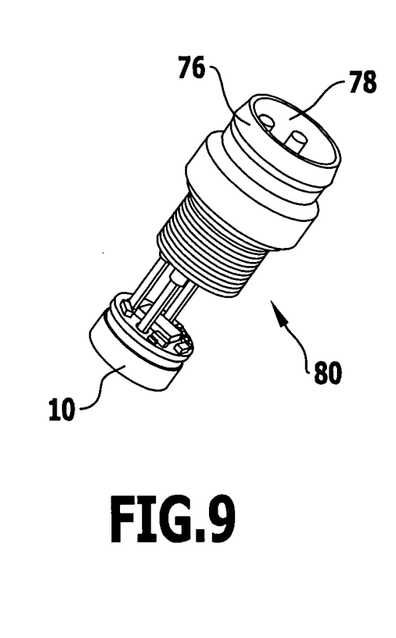
FIG. 9 is a partial representation of a first exemplary embodiment of an inductive proximity sensor having an inductive sensor module.

In a further exemplary embodiment, which is shown schematically in partial representation in FIG. 9 (a housing is not shown), a sensor module 10 is mechanically and electrically connected by means of the pin elements 32*a*, 32*b*, 32*c* to an electrical connection device 76 for external connection. The electrical connection device 76 comprises a (three-conductor) plug connector 78, to which a plug can be fixed. This allows connection to the "outside world" to allow an energy supply to be provided and sensor signals to be conveyed.

As a result, an inductive proximity sensor 80 is formed that can be configured in particular with a small length (parallel to the direction of spacing between the first side 14 and the second side 16).

Figure 10:
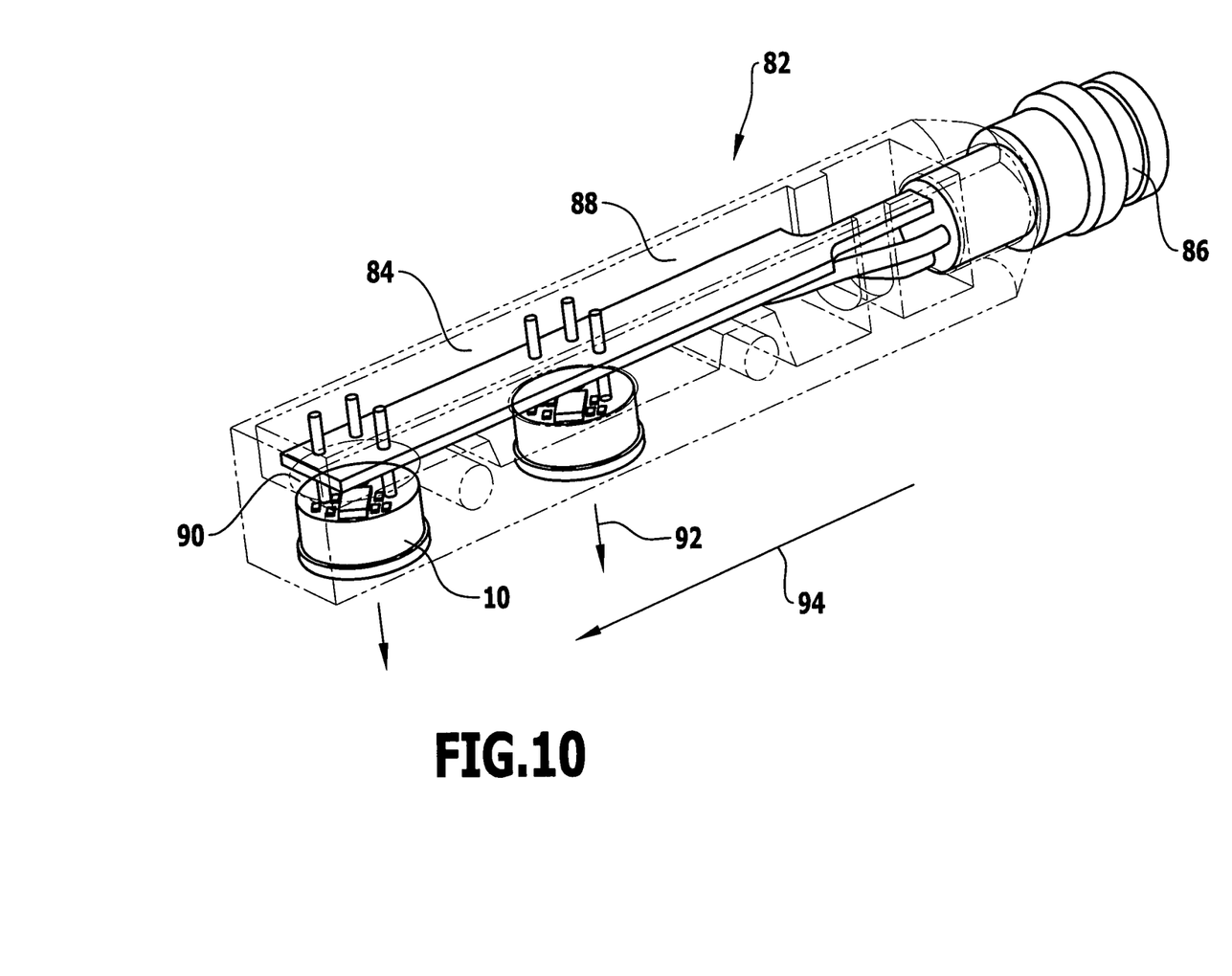
FIG. 10 shows a second exemplary embodiment of an inductive proximity sensor comprising inductive sensor modules.

A further exemplary embodiment of an inductive proximity sensor, which is shown in FIG. 10 and given the reference 82 there, comprises a housing 84. An electrical connection device 86 is provided for a plug connector. A connector 88 connected to the electrical connection device 86 is arranged in the housing.

The connector 88 has at least one receiving space 90 for a sensor module 10. Two receiving spaces 90 are provided for respective sensor modules 10 in the exemplary embodiment shown in FIG. 10. These are fixed to the receiving spaces 90, wherein fixture occurs in particular by means of push-on connection.

The sensor modules 10 are connected electrically and mechanically to the connector 88. The energy supply of the sensor modules 10 occurs through the connector 88. In addition a signal conduction occurs through the connector 88. In this case, the sensor signals of the respective sensor module 10 can be conveyed separately.

In the exemplary embodiment shown in FIG. 10, viewing directions 92 of the sensor modules 10 lie transversely to a direction 94 of the longitudinal extent of the housing 84. The electrical connection device 86 is arranged in the direction 94 of the longitudinal extent.

Figure 11:
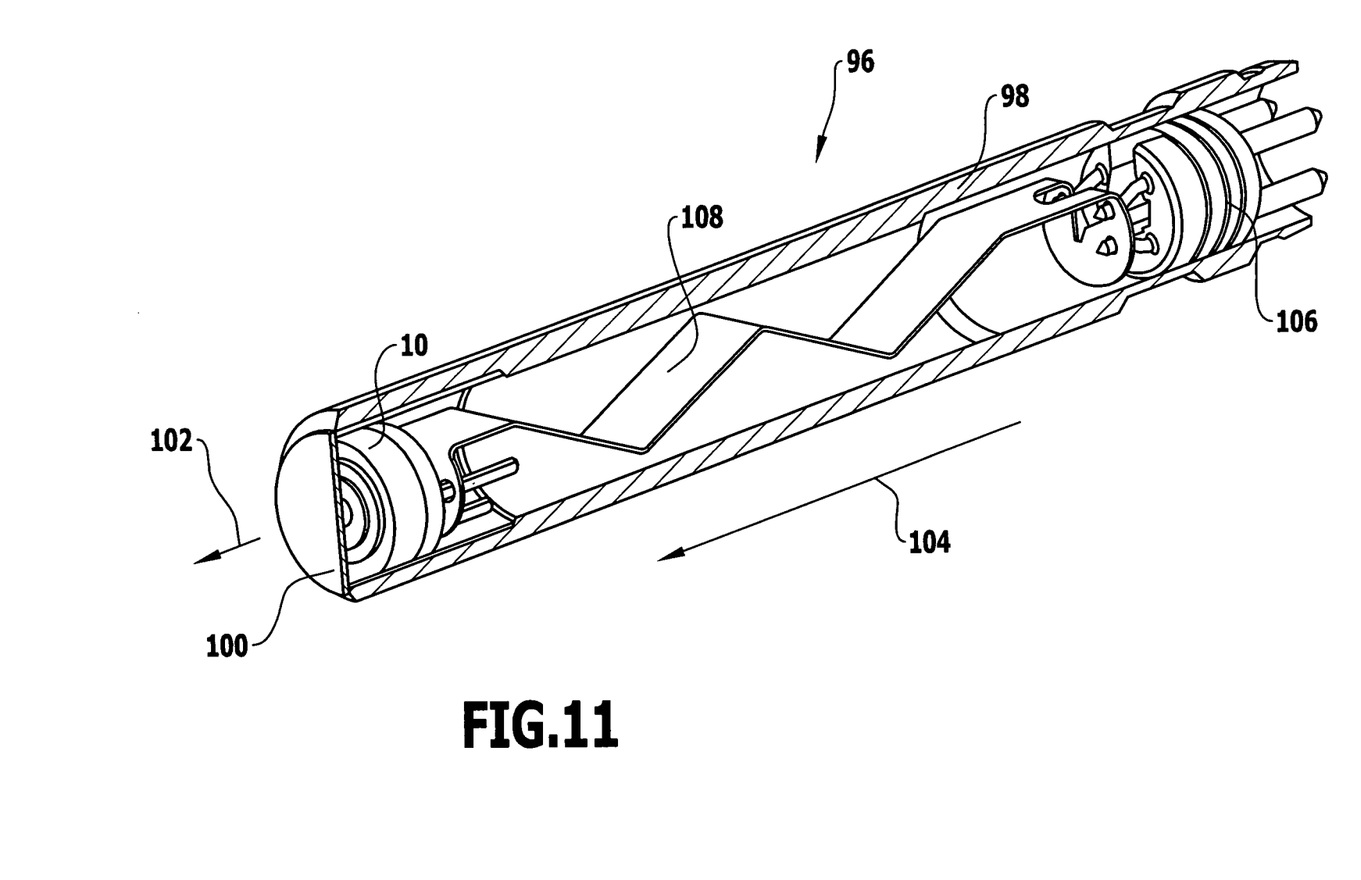
FIG. 11 shows a third exemplary embodiment of an inductive proximity sensor with an inductive sensor module.

A third exemplary embodiment of an inductive proximity sensor in accordance with the invention, which is shown in FIG. 11 and given the reference 96 there, comprises a housing 98. A sensor module 10 is arranged on a face 100 of the housing 98. A viewing direction 102 of the sensor module 10 is parallel to the direction 104 of the longitudinal extent of the housing 96.

An electrical connection device 106 is also arranged in the direction 104 of the longitudinal extent.

A connector 108, to which the sensor module 10 is fixed mechanically, is positioned in the housing. The connector 108 additionally assures the electrical connection to the sensor module 10 and the electrical connection device 106.

The sensor module 10 comprises the internal connection device for connection to an electrical connection device 76, 86 etc. The internal connection device is arranged in particular on the second side 16 of the carrier 12. The internal connection device has a reverse polarity protection, for example, to avoid failure as a result of incorrect pole connection. The internal connection device can also have a constant current source that supplies a driver. For example, a light-emitting diode can be actuated by means of the driver in order to display a correct and/or incorrect connection.

The sensor module 10 in accordance with the invention can be produced with a minimised height in the direction of spacing between the first side 14 and the second side 16. The electronic components 60 and in particular the complete evaluation device 62 are arranged on the rear side of the carrier 12, which also holds the coil arrangement 18. The sensor module 10 can be used in a wide variety of ways. Inductive proximity sensors can be formed in modular configuration such as shown on the basis of FIGS. 7 to 11, for example.

The sensor module 10 can itself be produced in a simple manner with a high degree of automation.

In particular the carrier 12 can be produced using SMD processes (SMD=surface mounted device). Connection wires of the coil 52 or coil 56 can be connected to the board 20, for example, by thermocompression welding in the recesses 46, 48 of the core 36. Assembly of the second side 16 of the carrier 12 with the electronic components 60 can be conducted by machine and a solder joint can also be produced by machine.

Carriers 12 (mother boards) can be produced efficiently including assembly and placement of the pin elements 32, 32b, 32c, for example, by means of an appropriate press. The individual carriers 12 can then be separated in a simple manner after assembly by means of UV laser irradiation. After being pressed into place, the pin elements 32a, 32b, 32c can be additionally be fixed to the carrier 12 by cold welding, for example.

A multiplicity of possible ways result for the electrical connection of the sensor module 10 (for energy supply and for conduction of sensor signals and possibly also for actuation of the sensor module 10). For example, an axial or radial cable outlet is possible via the cable fixture element 64.

The cable fixture element 64 is preferably transparent in configuration. In particular, this is a plastic part. As a result, the cable fixture element 64 can also act as a light guide for a light-emitting diode arranged on the second side 16 of the carrier 12.

In addition, the cable fixture element 64 can be shaped for a corresponding housing closure.

As shown by way of example in FIGS. 9 to 11, the sensor module 10 can also be installed in other housing shapes.

The invention claimed is:

1. Inductive sensor module, comprising:
    an evaluation device;
    a coil arrangement; and
    a single circuit board, on which electronic components of the evaluation device are arranged;
    wherein:
    the coil arrangement is directly mounted on a first side of the single circuit board and all the electronic components of the evaluation device are directly mounted on a second side of the single circuit board which is opposite the first side;
    the coil arrangement comprises a pot core and at least one coil;
    the pot core is seated on a plate; and
    the plate is arranged on the first side of the single circuit board.

2. Inductive sensor module in accordance with claim 1, wherein the plate has electrical contact areas, which provide electrical contact paths from a side facing the pot core to the circuit board.

3. Inductive sensor module in accordance with claim 1, wherein the pot core has at least one recess, which extends through to the plate.

4. Inductive sensor module in accordance with claim 3, wherein connection wires of the at least one coil are arranged in the at least one recess.

5. Inductive sensor module in accordance with claim 1, wherein an internal connection device is arranged on the second side of the circuit board.

6. Inductive sensor module in accordance with claim 1, wherein a plurality of pin elements are provided, which project beyond the second side of the circuit board.

7. Inductive sensor module in accordance with claim 6, wherein the pin elements are fixed in recesses of the circuit board.

8. Inductive sensor module in accordance with claim 6, wherein a mechanical fixture facility of the sensor module is provided by means of the pin elements.

9. Inductive sensor module in accordance with claim 6, wherein the pin elements provide an electrical contact to the inductive sensor module.

10. Inductive sensor module in accordance with claim 6, wherein three pin elements are provided.

11. Inductive sensor module in accordance with claim 1, wherein a cable fixture element is arranged on the circuit board on the second side.

12. Inductive sensor module in accordance with claim 11, wherein the cable fixture element is fixed to pin elements.

13. Inductive sensor module in accordance with claim 11, wherein the cable fixture element has fixture regions for respective fixture of a cable conductor.

14. Inductive sensor module in accordance with claim 13, wherein a cable conductor is connectable to a pin element at a fixture region.

15. Inductive sensor module in accordance with claim 13, wherein a fixture region is configured as a clamping region for clamping a respective cable conductor.

16. Inductive sensor module in accordance with claim 11, wherein the cable fixture element has at least one receiving area for a cable.

17. Inductive sensor module in accordance with claim 16, wherein the at least one receiving area allows at least one of (i) a cable feed in a direction parallel to a direction of spacing between the coil arrangement and the circuit board, and (ii) a cable feed in a transverse direction to the direction of spacing.

18. Inductive sensor module in accordance with claim 11, wherein the cable fixture element is formed to be optically transparent.

19. Inductive sensor module in accordance with claim 1, wherein an at least approximately circular outer contour cross-section is provided.

20. Inductive proximity sensor comprising at least one inductive sensor module, said sensor module comprising:
    an evaluation device;
    a coil arrangement; and
    a single circuit board, on which electronic components of the evaluation device are arranged;
    wherein:
    the coil arrangement is directly mounted on a first side of the single circuit board and all the electronic components of the evaluation device are directly mounted on a second side of the single circuit board which is opposite the first side;

the coil arrangement comprises a pot core and at least one coil;

the pot core is seated on a plate; and the plate is arranged on the first side of the single circuit board.

21. Inductive proximity sensor in accordance with claim 20, wherein an electrical connection device is provided, which is electrically connected to the at least one sensor module.

22. Inductive proximity sensor in accordance with claim 21, wherein the at least one sensor module is seated directly on the electrical connection device.

23. Inductive proximity sensor in accordance with claim 21, wherein the at least one sensor module is seated on a connector, to which the electrical connection device is at least electrically connected.

* * * * *